United States Patent [19]

Hale

[11] Patent Number: 4,815,787

[45] Date of Patent: Mar. 28, 1989

[54] MOUNTING OF A TOPPER ON A PICKUP TRUCK

[76] Inventor: Charles R. Hale, Rt. #2, Box 85-1, Belle Plaine, Kans. 67013

[21] Appl. No.: 148,879

[22] Filed: Jan. 27, 1988

[51] Int. Cl.$^4$ ............................................... B60P 3/32
[52] U.S. Cl. ................................... 296/167; 296/35.3; 296/43; 296/10
[58] Field of Search ................. 296/167, 156, 3, 35.3, 296/36, 43, 100, 37.6

[56] References Cited

U.S. PATENT DOCUMENTS

| 4,123,099 | 10/1978 | Mashigan | 296/10 |
| 4,231,610 | 11/1980 | Stoll | 296/167 |
| 4,269,443 | 5/1981 | Farmer | 296/35.3 |
| 4,423,899 | 1/1984 | Langmead | 296/3 |
| 4,444,427 | 4/1984 | Martin | 296/43 |
| 4,531,774 | 7/1985 | Whatley | 296/37.6 |
| 4,627,655 | 12/1986 | Collins | 296/167 |

*Primary Examiner*—Robert R. Song
*Attorney, Agent, or Firm*—Robert E. Breidenthal

[57] ABSTRACT

A topper provided with a U-shaped frame that is sealingly secured to the lower coplanar edges of its side walls and the joining front wall, with the frame having a plurality of depending posts that mate with sockets along the flanged upper edges of the truck side walls. The posts serve as supports when the topper is dismounted. The frame is provided with a lower surface seal for contact with the side wall flanges, and latches releasably secure the topper in mounted condition.

11 Claims, 2 Drawing Sheets

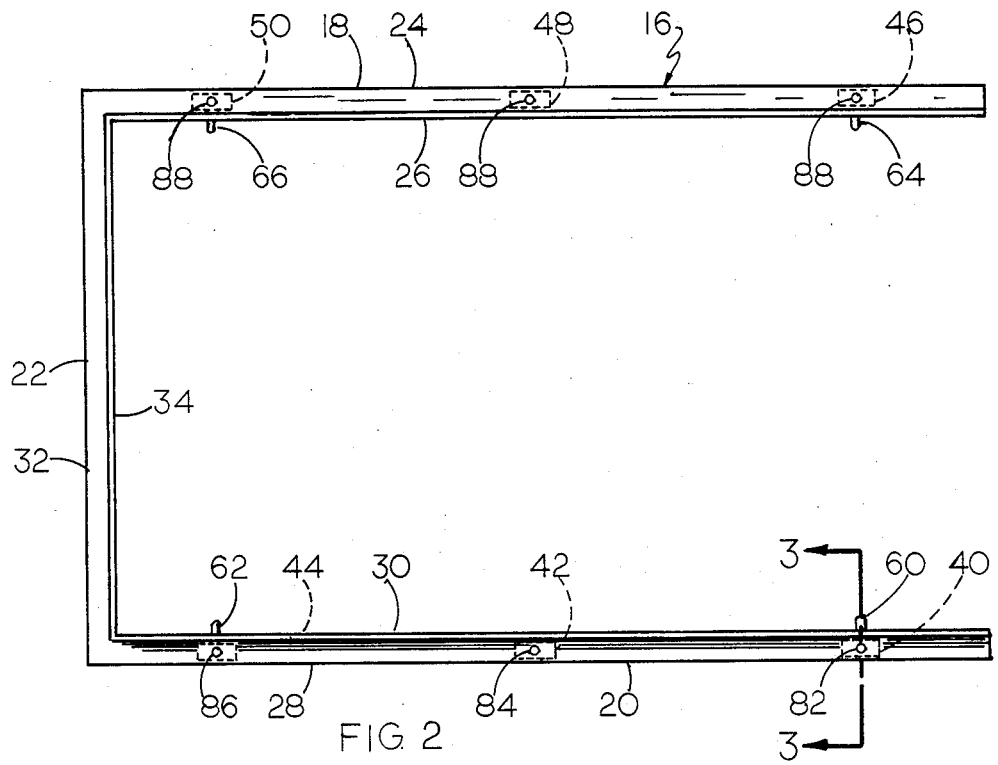
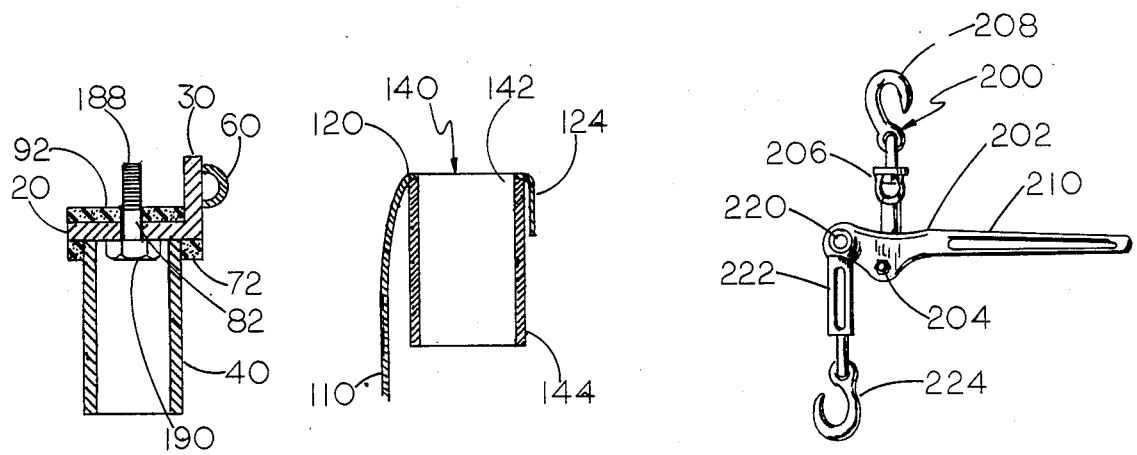
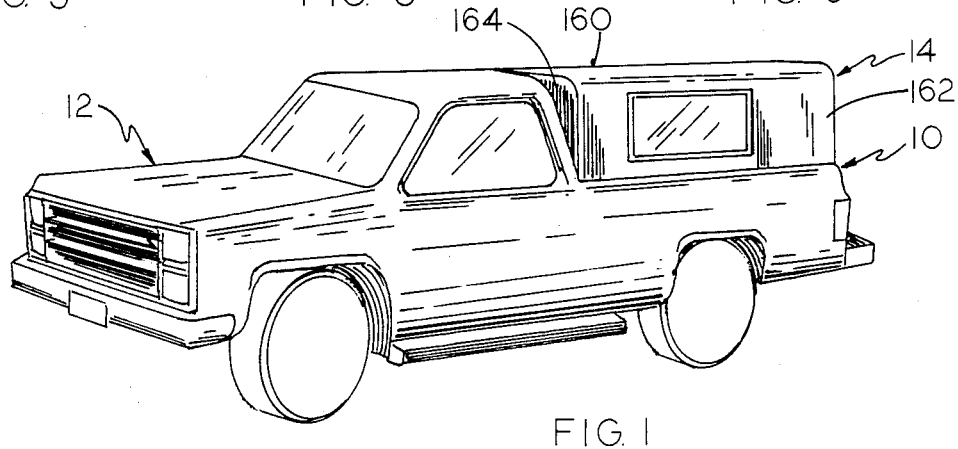

MOUNTING OF A TOPPER ON A PICKUP TRUCK

BACKGROUND OF THE INVENTION

1. Field of the Invention

The present invention relates to new and useful improvements in apparatus for detachably mounting toppers on pickup trucks, and more particularly relates to such apparatus that can be expeditiously and precisely oriented with respect to a topper and thereupon be sealingly fixed thereto; and when so assembled, the assembly can thereafter be sealingly and detachably secured to the upper edges of side and front walls.

2. Description of Related Art

Structure for at least partially covering and enclosing the space overlying the beds of pickup trucks have been employed for years. Usually such structures have been mounted in a detachable fashion so they could be set aside, as their continued presence obstructed or precluded the use of the truck for many other purposes or was incompatible with accommodating some kinds of loads or cargo.

A great number of different proposals have heretofore been made for detachably mounting such structures. An appreciation of the general nature of such prior art proposals may be gleaned on considering the disclosures of some prior U. S. patents U.S. Pat. No. 4,531,774 which issued on July 10, 1985 to Whatley, discloses an anchor structure that can be forcibly wedged in a stake pocket or socket of a truck side wall for securing a tool box or the like thereon.

U.S. Pat. No. 1,425,596 which issued on Aug. 15, 1922 to Kramer, discloses depending posts fixed to side walls for reception in sockets along edges of a truck flat bed.

U.S. Pat. No. 4,079,989, which issued on Mar. 21, 1978 to Robertson, discloses a U-shaped frame mounted to the upper edges of the front and side walls of a pickup truck by means that utilize the customary socket holes. A cover is pivoted to the front part of the U-shaped frame.

U.S. Pat. No. 3,069,199, which issued on Dec. 18, 1962, to Reardon et al, discloses the side walls of a pickup truck cover having ports that are projected into the socket holes.

U.S. Pat. No. 3,765,713, which issued on Oct. 16, 1973, to Suitt, discloses a carrier rack mounted on a pickup truck by structure that includes depending posts that can be inserted in socket holes.

U.S. Pat. No. 4,423,899, which issued on Jan. 3, 1984, to Langmead, discloses mounting structure (see FIG. 6) utilizing depending posts for insertion in socket holes.

U.S. Pat. No. 4,269,443, which issued on May 26, 1981, to Farmer, discloses a van body secured by bolts to a sill about the periphery of a flat truck bed.

U.S. Pat. No. 3,741,605, which issued on June 26, 1973, to Lee, discloses the use of stake sockets at lateral edges of low slung truck bed.

U.S. Pat. No. 4,444,427, which issued Apr. 24, 1984, to Martin, discloses frame members having depending posts or stakes received in the stake sockets of a pickup truck. Such frame members are secured to overlying pocket or socket defining structures by threaded means.

U.S. Pat. No. 4,123,099, which issued on Oct. 31, 1978, to Mashigan, discloses a topper-like structure mounted on a pickup truck, with padding interposed at the juncture of such structure and the side walls of the truck.

SUMMARY OF THE INVENTION

The paramount purpose of the invention is to provide a topper mounting assembly that can be accurately and permanently secured to a topper with a weatherproof connection, with such mounting assembly enabling the topper to be selectively stored in and off the ground position, or releasably secured to a pickup truck with a weatherproof connection therebetween.

A closely related object is to afford shelter or a secure location for the seal when the latter is not applied to bear against the pickup walls.

The invention involves the provision of a U-shaped frame specially adapted to be sealingly secured to the lower periphery of a topper's side and front walls, and depending posts are fixed to the underside of the frame for slidable reception in the sockets conveniently provided at the top of the pickup side walls. Means are provided to force the frame downwardly on the pickup side walls with a seal compressively engaged therebetween.

The frame is secured to the topper by bolts extending through openings, one of which is in the frame and which serves as a guide in the drilling of the other opening which is in the topper. The result is assurance of accurate and precise orientation of the topper relative to the frame.

Sealing means are adhesively secured to the underside of the frame, whereby such means are sheltered when not operating as a seal between the frame and the pickup side walls.

A broad aspect of the invention involves for use in the detachable mounting of a topper on a pickup truck, mounting structure comprising a U-shaped frame adapted to conform to the side and front walls of a pickup truck, said frame including parallel legs joined at their forward ends by a web, with said legs and said web being of an L-shape in transverse section defined by a horizontal base plate and an integral upstanding guide flange, said guide flange of the web being at the rear edge of the base plate of the web, and the guide flanges of the legs being at the adjacent edges of the base plates of the legs, each of the base plates of the legs being provided with a pair of longitudinally spaced, depending tubular posts fixed thereto that are adapted to be received in sockets along the upper edges of pickup side walls, and said base plates of the legs being provided with apertures that are in registry with the tubular posts, with said apertures having dimensions less than the internal dimensions of the posts.

BRIEF DESCRIPTION OF THE DRAWINGS

Various features and advantages of the invention will be best and most readily appreciated in the light of the ensuing description of a preferred embodiment of the same, such description being given in conjunction with the accompanying drawings illustrative thereof, wherein:

FIG. 1 is an isometric view of a pickup truck with a topper mounted thereon in accordance with the invention;

FIG. 2 is an elevational view of the mounting frame on an enlarged scale;

FIG. 3 is an enlarged vertical sectional detail view taken upon the plane of the section line 3—3 in FIG. 2, with a fastening bolt being additionally shown as positioned on final assembly;

FIG. 5 is an enlarged vertical detail view taken upon the plane of the section line 5—5 in FIG. 4; and, FIG. 6 is an enlarged elevational view of the lever actuated securing means for releasably securing the topper and its mounting assembly to the pickup truck.

DESCRIPTION OF THE PREFERRED EMBODIMENT

Figure 4:
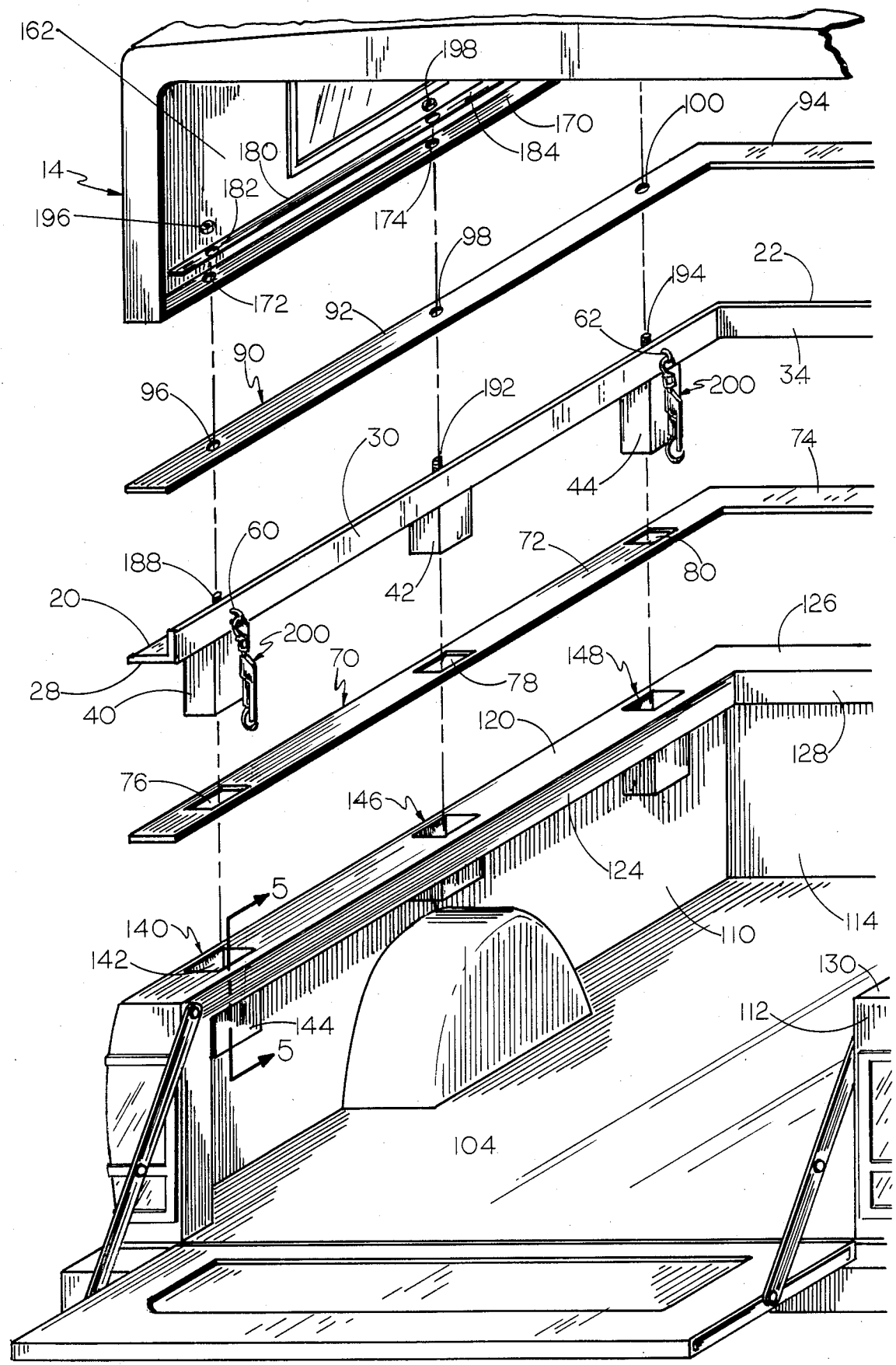
FIG. 4 is an exploded and fragmentary assembly view of the mounting means and its operative association with the side and front walls of a pickup truck and the flanged lower edges of the walls of a topper.

Referring now to the drawings wherein like numerals designate like parts throughout the various views, the numeral 10 designates generally the combination of a conventional pickup truck 12 with a conventional topper 14 mounted thereon. The instant invention is concerned with the means for mounting the topper 14 on the truck 12 and the same will now be described.

The mounting means includes a U-shaped frame designated generally at 16, the same being comprised of a pair of spaced parallel legs 18 and 20 that are integrally joined at their forward ends by a web 22. The frame 16 can be conveniently fabricated of standard angle iron stock and be of welded assembly. With such construction, the leg 18 is constituted of a horizontal base plate 24 with an integral upstanding flange 26 along its edge nearest the leg 20.

Similarly, the leg 20 is constituted of a base plate 28 and an upstanding flange 30 as clearly shown in FIG. 3. Plainly, the leg 20 is a mirror image of the leg 18. The web 22 has a configuration similar to that of the legs 18 and 20 and is comprised of a base plate 32 that is coplanar with the base plates 24 and 28 and the rear edge of the base plate 32 is integral with an upstanding flange 34.

As clearly shown in FIG. 2, the forward ends of the flanges 26 and 30 adjoin and are secured to the opposite ends of the flange 34 to the end that the open frame 16 is rather rugged and sturdy for its size and weight.

At spaced intervals along the leg 20, depending tubular posts 40, 42 and 44 are dependingly secured, as by welding or the like, to the underside of the base plate 28. As clearly shown in FIG. 3 in connection with post 40, it is preferred that the posts 40, 42 and 44 are of less width than the leg 20. For reasons to be made clear presently, the tubular posts 40, 42 and 44 are preferably of generally rectangular transverse section. Also for reasons to be explained, eyes 60 and 62 are welded to the side of the flange 30 facing from the base plate 28 at positions spaced to coincide with the tubular posts 40 and 42 respectively.

In a corresponding fashion, the leg 18 is provided with depending tubular posts 46, 48 and 50, and with eyes 64 and 66; all in keeping with mirror image relationship of the legs 18 and 20.

A generally U-shaped resilient sealing gasket 70 comprised of parallel legs (one of which is visible in FIG. 4 at 72) joined by a web 74. The legs and web of the gasket have dimensions corresponding to the legs 18 and 20 and the web 22 of the frame 16 and the gasket 70 is disposed to underlie and is adhesively permanently secured to the underside of the frame 16, with the gasket 70 being provided with openings for downward projection of the posts therethrough such as the openings indicated at 76, 78 and 80 in FIG. 4 for accommodating the posts 40, 42 and 44 respectively.

As thus far described, it will be seen that the posts 40–50 can support the frame 16 upon any suitable horizontal surface, not shown, with the gasket 70 being in a sheltered position spaced above such supporting surface.

The base plate 28 is provided with apertures 82, 84 and 86 that are in registry with the hollow interiors of the tubular posts 40, 42 and 44, respectively, as clearly shown in FIG. 3 with respect to the aperture 82 and the tubular post 40. Such FIG. 3 also makes it clear that the aperture 82 is of substantially smaller size than the interior of the tubular post 40. The base plate 24 is similarly provided with apertures 88 that are mirror images of the apertures 82–86.

A resilient sealing gasket 90 of a U-shape configuration is provided that is dimensional to overlie the horizontal upper surfaces of the base plates 28, 32 and 24. The portions of the gasket 90 overlying the base plates 28 and 32 are indicated respectively at 92 and 94 in FIG. 4.

The gasket 90 has openings therethrough that register with the apertures in legs 18 and 20. As shown in FIG. 4, the openings 96, 98 and 100 are of the same size and respectively register with the apertures 82, 84 and 86 when the gasket is positioned atop the frame 16. If deemed necessary, or expedient, the gasket 90 can be adhesively secured to the frame 16, though such is not ordinarily necessary.

The pickup truck 12 is conventional and typically has a load bed 104 laterally bounded by upstanding side walls 110 and 112 that are joined at their forward ends by a front wall 114. The side wall 110 has an inturned and integral horizontal flange 120 at its upper end that terminates in an integral downturned lip 124 that serves to reinforce the overall side wall structure.

The front wall 114 in an analogous fashion includes a horizontal flange 126 and integral reinforcing lip 128. As clearly shown in FIG. 4, the flanges 120 and 126 are joined as are their lips 124 and 128. The flanges 120 and 126 are coplanar. The side wall 112 is substantially a mirror image of the side wall 110 and its components 120 and 124, with a portion of the flange corresponding to the flange 120 being indicated at 130.

The side wall 110 is provided with what may be termed socket means or post receiving means 140 which comprises the flange 120 being provided with a rectangular opening 142 that opens into a depending sleeve or re-entrant tubular member 144 fixedly secured to the flange 120. The sleeve 144 is generally conformable to the configuration of the tubular post for slidingly receiving the latter therein.

Conventional post receiving means are of a rectangular configuration and that is why the post 40 has such a configuration. Should the post receiving socket have some other configuration, say circular, the tubular post 40 would obviously be selected to have a conformable configuration.

The side wall 110 is additionally provided with additional spaced socket or post receiving means 146 and 148 for concurrently receiving the tubular posts 42 and 44.

It will be understood that the side wall 112 is, in mirror image fashion, provided with socket or post receiving means corresponding to such means 140, 146 and 148 for receiving the posts 46, 48 and 50.

The topper 14 is of conventional construction and includes a roof 160, side walls (one being visible at 162 in FIG. 1), and a front wall 164. All of such walls 162 and 164 have coplanar lower edges with such lower edges being provided with integral, inwardly directed, horizontal flanges such as the flange 170 visible in FIG. 4 that is carried by the side wall 162. The flanges at the lower edges of the side 162 and front 164 walls of the topper 14 have a generally U-shaped configuration that is conformable to that of the resilient sealing gasket 90.

The topper and the mounting means may be conveniently assembled by the following procedure which comprises positioning the frame 16 on the pickup truck 12 with the posts received in their appropriate post receiving means. Such will enable convenient access to the open lower ends of the sleeves and the posts such as the sleeve 144 and the post 40.

The topper 14 is then lowered so that the flanges thereof seat upon the gasket 90, it being noted that the flanges 30, 26 and 34 serve to facilitate guidance of the topper 14 as it is lowered to seat on the gasket 90.

With the topper 14 positioned atop the frame 16 and seated on the gasket 90, the installer then drills the opening 172 through the flange 170. In this operation the opening 172 is drilled from below through the post 40 and the sleeve 144 with the aperture 82 serving as a guide to assure perfect alignment of the aperture 82 and the opening 172.

The installer then proceeds to drill openings in the side wall flanges of the topper using the apertures 82-88 as guides. The aperture 84 serves to guide in the drilling of the opening 174, and so on to completion.

In the preferred assembly, a reinforcing strip 180 is provided having openings corresponding in spacing to the apertures 82-86, with two of such openings in the strip 180 being shown at 182 and 184. The topper side wall opposite the side wall 162 is correspondingly provided with a strip not shown.

Threaded means are then applied to secure the topper 14 to the frame 16 with the resilient gasket 90 being compressed therebetween to effect a weather-tight seal therebetween.

As best shown in FIG. 3 a threaded bolt 188 is passed upwardly through the aperture 82 and the gasket opening 96 with the head 190 of the bolt engaging the underside of the base plate 28. The bolt 188 thence extends upwardly through the opening 172 in the flange and then through the opening 182 in the strip 180.

In an analogous fashion bolts 192 and 194 projected upwardly from the apertures 84 and 86, with the bolt 192 extending through the opening 184 in the strip 180.

All the bolts extending through the apertures 82-88 are provided with nuts threaded and tightened thereon such as the nuts shown at 196 and 198 in FIG. 4. Tightening of the nuts compresses the gasket 90 between the topper 14 and the frame 16 so an excellent and permanent seal therebetween is obtained. If desired or deemed expedient, the bolts and nuts can be provided with lock washers, not shown, to assure that the nuts do not loosen.

With the topper 14 and the frame 16 assembled as described above, the entire assembly can be raised from the truck 12 and placed to rest on any suitable supporting surface, not shown. The frame 16 will then be somewhat elevated by reason of the support of the posts so that the same can be readily grasped for reloading on the truck. As mentioned previously, the gasket 70 is disposed in a relatively sheltered location so that a good seal can be repeatedly obtained on repositioning on the truck.

When the topper and mounting means assembly are positioned on the truck, means are then actuated to secure the same to the truck, such means comprises the use of conventional lever actuated load binders 200 applied to secure the eyes such as those indicated at 60 and 62 to the sleeves associated with the post receiving means 140 and 148.

The load binder 200 is conventional and may be such as illustrated and described as "Lebus Load Binders" on page 506 of the sales catalog of Watkins, Inc., located at 711 W. Second St., Wichita, Kan. 67201.

The binder 200 comprises a toggle lever 202 pivoted intermediate its ends to an element 206 provided with a hook 208 that is engageable with an eye such as that shown at 60. The lever includes an elongated handle portion 210. Opposite the pivot 204 from the handle 210 the lever is pivoted at 220 to an element 222 having a hook 224 that is engageable under a sleeve such as the sleeve 144.

The operation of the binder 200 when its hooks are engaged as described, the handle 210 is swung downwardly so as to pull the hooks 208 and 224 toward each other. The lever 202 is passed through dead center or the toggle position so that the binder 200 will retain the hooks tensioned toward each other until a definite force is applied to the lever 202 to restore its original position. The binder 200 can conventionally lock in its securing position so as to prevent unauthorized removal of the topper 14 from the truck 12.

Having now fully described the invention as to its structure, function and use, attention is now directed to the appended claims for an appreciation of the actual scope of the invention.

I claim:

1. For use in the detachable mounting of a topper on a pickup truck, mounting structure comprising a U-shaped frame adapted to conform to the side and front walls of a pickup truck, said frame including parallel legs joined at their forward ends by a web, with said legs and said web being of an L-shape in transverse section defined by a horizontal base plate and an integral upstanding guide flange, said guide flange of the web being at the rear edge of the base plate of the web, and the guide flanges of the legs being at the adjacent edges of the base plates of the legs, each of the base plates of the legs being provided with a pair of longitudinally spaced, depending tubular posts fixed thereto that are adapted to be received in sockets along the upper edges of the pickup side walls, and said base plates of the legs being provided with apertures that are in registry with the tubular posts, with said apertures having dimensions less than the internal dimensions of the posts.

2. The combination of claim 1, wherein the frame has secured thereto means adapted for releasably securing the frame to a pickup truck.

3. The combination of claim 1, including a resilient sealing gasket fixedly secured to the undersides of the base plates of the legs and the web, with said sealing gasket having openings through which the posts downwardly project, whereby the sealing gasket is sheltered when the mounting structure is set aside from a pickup truck.

4. The combination of claim 3, wherein the frame has securing means secured thereto adapted to releasably secure the frame to a pickup truck with the gasket compressively forced against the latter.

5. The combination of claim 4, wherein the securing means is fixed to adjacent sides of the flanges of the legs and includes a pivoted toggle lever, with such lever being provided with an element on one side of its pivot adapted to engage a pickup side wall and with the other side of the lever from its pivot constituting a handle, and said securing means being adapted to be retained in its securing condition.

6. The combination of claim 1, together with a topper having spaced side walls joined by a front wall, said side and front walls having coplanar lower edges, said side walls being provided with opposed and integral horizontal flanges having free edges that are generally conformable to the oppositely facing sides of the flanges of the frame legs, said front wall having an integral, rearwardly extending flange that has a free edge generally conformable to the forward face of the flange of the web, the arrangement being such that the flanges of the side and front walls of the topper can be seated upon the base plates of the legs and the web, with flanges of the legs and the web coacting with the free edges of the flanges of the side and front walls to guide seating registry of the topper on the frame, said flanges of the topper being provided with apertures in alignment with the apertures in the base plates, and fastening means extending through the aligned apertures of the topper and the frame to hold the topper and the frame in assembled relation.

7. The combination of claim 6, wherein a sealing gasket is interposed between the base plates of the frame and the flanges of the topper.

8. The combination of claim 6, wherein the fastening means comprises a threaded bolt and a nut threaded thereon.

9. The combination of claim 8, together with reinforcing strips positioned atop the flanges of the topper side walls, said strips having openings in registry with the apertures in the flanges of the topper side walls, with the bolts extending through the openings in the strips.

10. The combination of claim 6, including a resilient sealing gasket fixedly secured to the undersides of the base plates of openings through which the posts downwardly project, whereby the sealing gasket is sheltered when the mounting structure is set aside from a pickup truck.

11. The combination of claim 7, including a resilient sealing gasket fixedly secured to the undersides of the base plates of the legs and the web, with said sealing gasket having openings through which the posts downwardly project, whereby the sealing gasket is sheltered when the mounting structure is set aside from a pickup truck.

* * * * *